United States Patent [19]
Kotzer

[11] Patent Number: 5,573,720
[45] Date of Patent: Nov. 12, 1996

[54] EXTRUSION OF THERMALLY CROSS-LINKABLE MATERIALS

[75] Inventor: Moshe Kotzer, Post Karkur, Israel

[73] Assignee: Pipex Ltd., Israel

[21] Appl. No.: 492,052

[22] PCT Filed: Mar. 23, 1994

[86] PCT No.: PCT/GB94/00606

§ 371 Date: Jul. 19, 1995

§ 102(e) Date: Jul. 19, 1995

[87] PCT Pub. No.: WO94/21441

PCT Pub. Date: Sep. 29, 1994

[30] Foreign Application Priority Data

Mar. 24, 1993 [IL] Israel ........................................ 105159

[51] Int. Cl.$^6$ ...................................................... B29C 47/06
[52] U.S. Cl. ........................... 264/171.150; 264/171.17; 264/171.23; 264/171.24; 264/171.28; 264/209.6; 264/211.23; 264/236; 425/131.1; 425/133.5
[58] Field of Search ....................... 264/171.23, 211.23, 264/171.15, 209.6, 236, 171, 171.17; 425/131.1, 133.5, 144

[56] References Cited

U.S. PATENT DOCUMENTS

| | | | |
|---|---|---|---|
| 3,546,326 | 12/1970 | Seifert et al. ........................ | 264/211 |
| 3,576,933 | 4/1971 | Bates et al. ........................ | 264/331.17 |
| 3,591,674 | 7/1971 | Engel ................................. | 264/209.6 |
| 3,928,525 | 12/1975 | Fuwa et al. ........................ | 264/171.17 |
| 4,088,434 | 5/1978 | Fukuda et al. ..................... | 425/379.1 |
| 4,091,064 | 5/1978 | Kakinuma et al. ................. | 264/171.17 |
| 4,144,111 | 3/1979 | Schaerer ............................. | 264/171.28 |
| 4,235,834 | 11/1980 | Vetter et al. . | |
| 4,629,650 | 12/1986 | Kataoka ............................. | 264/338 |
| 4,797,242 | 1/1989 | Fukuda et al. ..................... | 264/209.2 |
| 5,034,179 | 7/1991 | Richter . | |
| 5,049,331 | 9/1991 | Hempel .............................. | 264/209.2 |
| 5,393,536 | 2/1995 | Brandt et al. ...................... | 264/209.6 |

FOREIGN PATENT DOCUMENTS

| | | | |
|---|---|---|---|
| 0138194 | 10/1983 | European Pat. Off. . | |
| 0113117 | 7/1984 | European Pat. Off. . | |
| 2302832 | 10/1976 | France . | |
| 3516470 | 11/1986 | Germany . | |
| 3704698 | 8/1988 | Germany . | |
| 3802049 | 1/1989 | Germany . | |
| 217703 | 1/1987 | United Kingdom ............... | 264/209.6 |
| 2191145 | 12/1987 | United Kingdom . | |

OTHER PUBLICATIONS

Japan 60–110240 (English Abstract.
Japan 59–232838 (English Abstract).

*Primary Examiner*—Jeffery R. Thurlow
*Attorney, Agent, or Firm*—Hedman, Gibson & Costigan, P.C.

[57] ABSTRACT

A technique for extrusion of plastic including a first step of extruding which includes extruding at least one layer of a thermally cross-linkable material in an extrusion apparatus (20) having at least one die wall (22); a second step of extruding, performed simultaneously with the first step of extruding, and which includes extruding at least one layer of thermoplastic material in the extrusion apparatus between the thermally cross-linkable material and the at least one die wall (22) and heating the thermally-cross-linkable material, thereby to provide at least a predetermined minimum rate of cross-linking thereof during the steps of extrusion of the plastic.

9 Claims, 5 Drawing Sheets

EXTRUSION OF THERMALLY CROSS-LINKABLE MATERIALS

FIELD OF THE INVENTION

The present invention relates to the extrusion of plastic products generally and more particularly to novel techniques for continuous extrusion of plastic products and novel plastic products.

BACKGROUND OF THE INVENTION

Continuous extrusion of plastic products, such as tubing and plastic coated cables often suffers from the consequences of high frictional resistance between the extruded plastic product and the static walls of the extruder die. This is particularly true with regard to the extrusion of thermally cross-linkable materials, wherein cross-linking occurs in response to heat applied in the extruder die. This will be understood from the following description.

Plastics are divided generally into two main categories: thermoplastic materials and thermosetting materials. Thermoplastic materials consist mainly of macromolecules formed of long chains of monomers, based on carbon and/or silicon atoms, which may or may not be branched, hub are of finite size, Molecules of thermosetting materials consist of three-dimensional networks which, theoretically, may extend infinitely, Thermoplastic materials may be formed either by cross-linking monomers or by cross-linking of thermoplastic materials. For example, Bakelite (R) (phenolformaldehyde) is formed generally by cross-linking of monomers, whereas cross-linked polyethylene is formed by cross-linking of thermoplastic polyethylene.

Thermosetting materials are preferable to thermoplastic materials in many respects, such as, heat resistance, mechanical strength, and low creep. By way of example, when polyethylene is cross-linked, its heat resistance, wear, creep characteristics, and resistance to chemicals are improved.

Notwithstanding the advantages of thermosetting materials, there is a certain difficulty in using them. This difficulty emanates from their particular internal structure which does not permit melting by heat of the material in its final form. It is difficult, therefore, to work these materials by use of some of the known processes.

It is especially difficult to use these materials in extrusion. This is due to the fact that thermosetting materials flows as a solid material, thereby causing very high frictional resistance between the extruder die wall and the extruded product. The consequences of such high frictional resistance during extrusion include reduced throughput, increased wear on the extrusion die and the extruded product and consequent decreased quality of the extruded product.

In order to overcome this problem, the prior art teaches extrusion of these materials prior to their being cross-linked, and in conditions which do not cause cross-linking. Cross-linking is thus carried out at a later stage, after extrusion, that is to say, after the extruded product has left the extruder die.

Throughout the specification and claims, the term "extrusion" is used to mean the forming process that is performed on the extruded material prior to its leaving the extruder die.

There are many methods of bringing about cross-linking after extrusion, in accordance with the material, technology and technical preference of the manufacturer. Some of these methods involve cross-linking immediately after extrusion, while others are performed at a later stage.

In the rubber industry, vulcanization (cross-linking) of natural thermoplastic rubber has been known for many years by the addition of sulfur and the application of heat.

It is also known to cross-link polyethylene, for example, by first, grafting of silane groups onto the monomer chain, prior to or during extrusion and, thereafter, exposing the extruded product to humidity, thereby to bring about cross-linking.

An alternative method of cross-linking of extruded polyethylene products is by exposing the extruded product to Beta or Gamma radiation.

Further methods include the preparation of suitable compounds which cause cross-linking on exposure to heat for a preselected time period. These methods involve extrusion at a relatively low temperature and/or for a short time, thereby preventing cross-linking during extrusion. The cross-linking is performed subsequently, by exposing the extruded product to heat at a higher temperature and for a preselected time. The heating may be provided, for example, by way of hot nitrogen, a hot salt bath, infrared heating, or microwave heating.

All of these prior art methods suffer from disadvantages, including the fact that they require an additional, separate process in order to provide the required cross-linking, thereby increasing both the time and cost of production. In many cases, the quality of the extruded products suffers from the effects of extruding at low temperatures and/or as a result of the addition of damaging cross-linking additives such as the above-mentioned silane groups.

Unsuccessful attempts have been made to carry out extrusion of thermosetting materials, in conditions that would allow cross-linking during the extrusion process.

One solution that is known in the art is to coat the interior surface of the extruder die with Teflon (R), thereby reducing the frictional resistance to flow of the thermosetting material.

It has, however, been found that the Teflon (R) wears very rapidly during the extrusion process, and it is, therefore, necessary to halt the production process frequently, in order to permit application of a new Teflon (R) layer to the die. These interruptions cause a loss in production time, both due to the actual coating of the die, and due to the additional start-up time that is required each time the process is restarted after coating. This loss in time, as well as the additional high cost of the Teflon (R) coating and its application, cause an unacceptably high increase in productions costs.

SUMMARY OF THE INVENTION

The present invention seeks to provide improved techniques for extrusion of plastic products and novel plastic products produced thereby.

There is thus provided in accordance with a preferred embodiment of the present invention, a technique for extrusion of plastic including:

a first step of extruding which includes extruding at least one layer of a thermally cross-linkable material in an extrusion apparatus having at least one die wall;

a second step of extruding, performed simultaneously with the first step of extruding, and which includes extruding at least one layer of thermoplastic material in the extrusion apparatus between the thermally cross-linkable material and the at least one die wall; and heating the thermally-cross-linkable material, thereby to provide at least a predetermined minimum rate of cross-linking thereof during the steps of extrusion of the plastic.

Additionally in accordance with a preferred embodiment of the invention, the first step of extruding includes the step of extruding the thermally cross-linkable material in the form of a tube, and the second step of extruding includes extruding concentric layers of the thermoplastic material between the thermally cross-linkable material and both inner and outer walls of the extrusion apparatus.

In accordance with a further preferred embodiment of the invention, the technique of the invention is a technique for producing a composite product of plastic and non-plastic materials, such as a plastic coated cable.

Further in accordance with a preferred embodiment of the invention, the technique also includes the step of cross-linking the thermoplastic material subsequent to the first and second steps of extruding.

Additionally in accordance with a preferred embodiment of the invention, the technique also includes the step of removing the layer of thermoplastic material extruded between the thermally cross-linkable material and the outer die wall subsequent to first and second steps of extruding.

Further in accordance with a preferred embodiment of the invention, one or more layers of a plastic material are extruded between the thermally cross-linkable material and the layer of thermoplastic material.

BRIEF DESCRIPTION OF THE DRAWINGS

The present invention will be understood and appreciated more fully from the following detailed description, taken in conjunction with the drawings in which.

DETAILED DESCRIPTION OF THE INVENTION

Figure 1A:
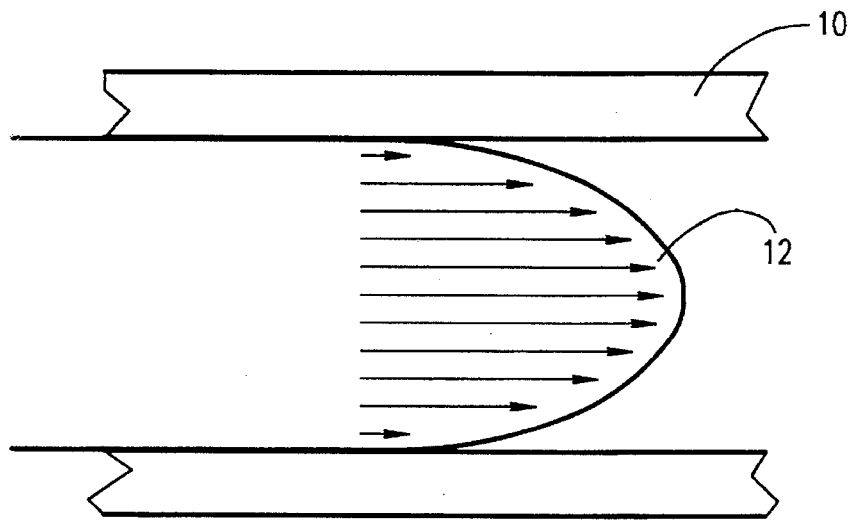
FIG. 1A illustrates typical flow velocity characteristics of a typical thermoplastic material flowing through an extrusion die.
Figure 1B:
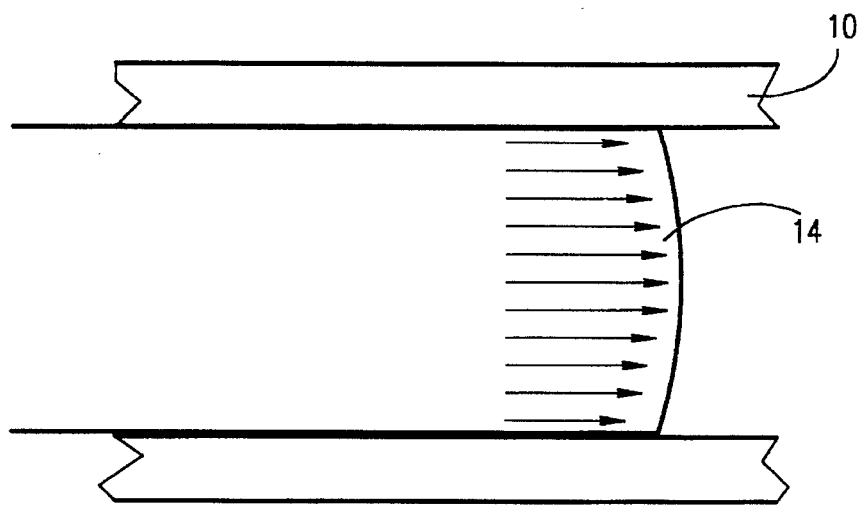
FIG. 1B illustrates flow velocity characteristics of a typical thermosetting plastic material flowing through an extrusion die.
Figure 1C:
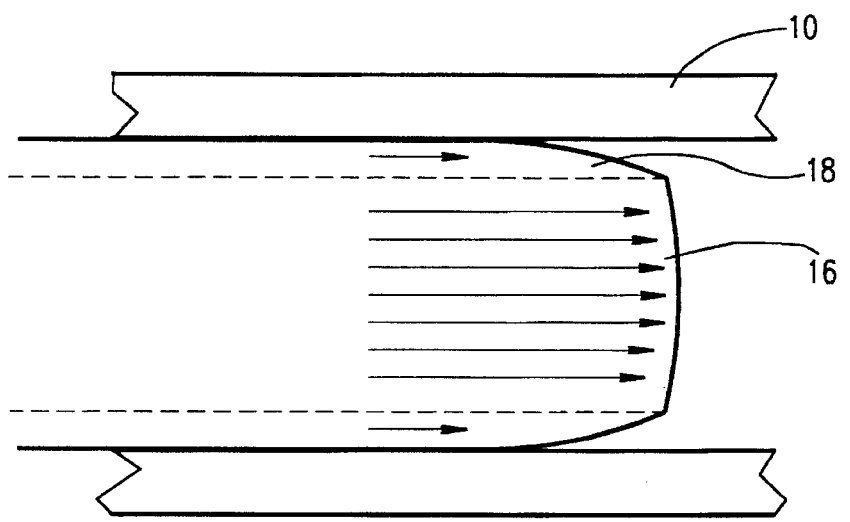
FIG. 1C illustrates typical flow velocity characteristics of a composite of a thermosetting plastic material disposed in an outer layer of a non-thermosetting material, flowing through an extrusion die, in accordance with a method of the invention.

In order to provide a basic understanding of a problem solved by the present invention, reference is now made to FIGS. 1A–1C, which show typical flow characteristics of different types of plastic product through an extrusion die, referenced 10. The lengths of the arrows indicate the relative magnitudes of the velocities of flow of the extruded plastic products through the die.

In FIG. 1A, the plastic product is a typical thermoplastic material 12, such as polypropylene (PP). It is seen that this material tends to flow readily through the die 10. Accordingly, relatively fast throughput speeds and a relatively low level of wear on the die results.

In FIG. 1B, the plastic product is a typical thermosetting cross-linked material 14, such as cross-linked polyethylene (XPE). As the material is cross-linked, it does not tend to stretch out while moving through the die as in the example of FIG. 1A. Rather, there is high frictional resistance between the material and an inner surface of the die, resulting in slow throughput speeds and a high level of wear on the die and on the resulting product.

In FIG. 1C there are shown typical flow characteristics of a plastic product formed in accordance with the present invention. The flow characteristics are those of a composite material, which includes an internal portion 16 of a material, such as a typical thermosetting cross-linked material 14 and an external portion 18 of a material, such as a typical thermoplastic material 12. It will thus be appreciated that, while the composite product is made largely of thermosetting material 14, as the external portion 18 is a thermoplastic material, the composite product encounters relatively little frictional resistance and thus moves through the die at relatively fast throughput speeds, and a relatively low level of wear on the die and the product are encountered.

Figure 2:
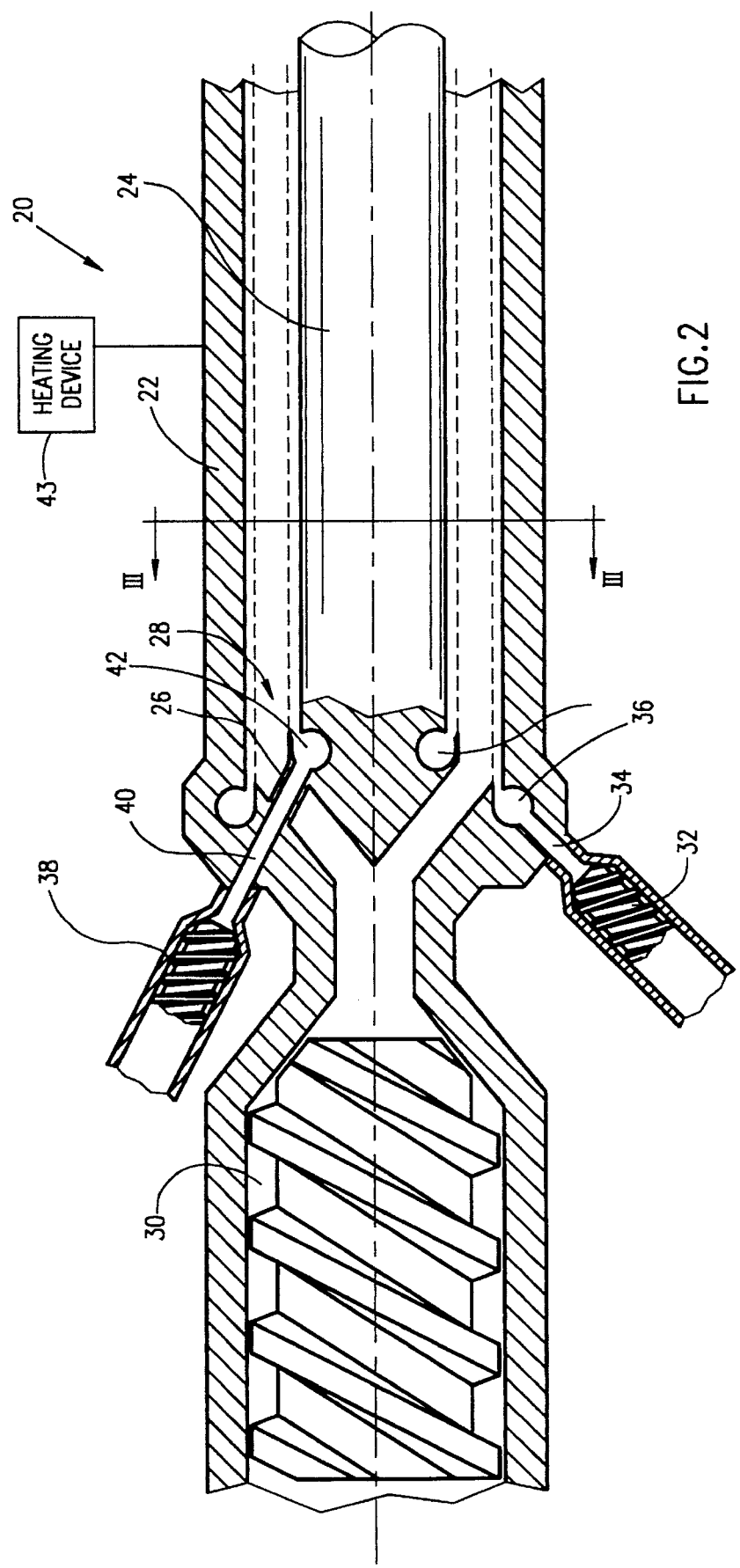
FIG. 2 illustrates an extrusion technique in accordance with a preferred embodiment of the present invention.
Figure 3:
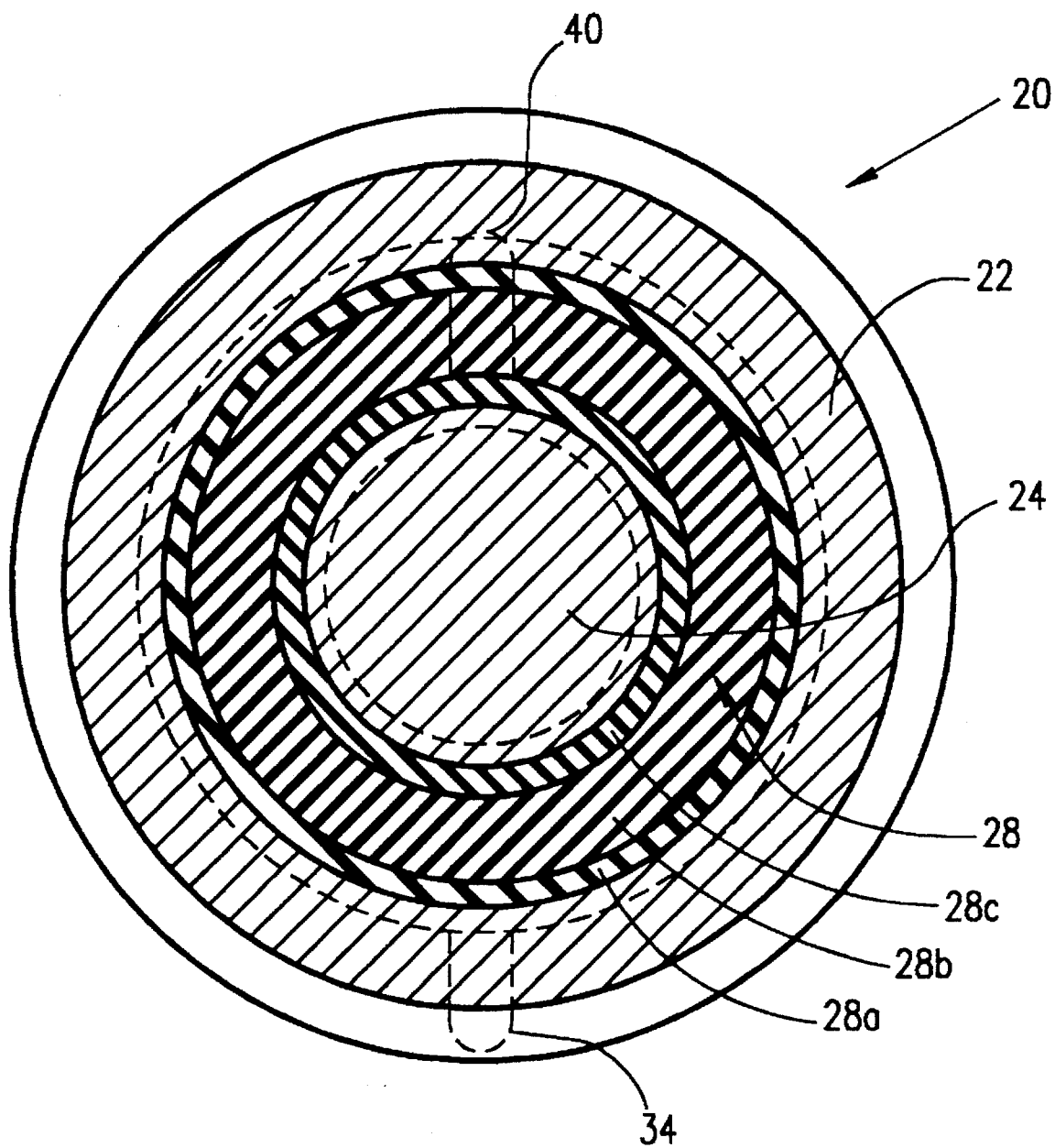
FIG. 3 is a sectional illustration taken along line 3—3 of FIG. 2.

Reference is now made to FIGS. 2 and 3 which illustrate an exemplary extrusion apparatus for performance of an extrusion technique by which composite plastic tubes are produced in accordance with a preferred embodiment of the present invention An extrusion die assembly 20 includes an outer, generally cylindrical die wall 22 and an inner, generally cylindrical die portion 24. The inner die portion 24 is connected to the outer die wall 22 by at least one vane 26. An extrusion volume 28 is defined between outer die wall 22 and the inner die portion 24.

A main extruder 30 supplies a thermally cross-linkable material under pressure to the extrusion volume 28 so as to constitute an inner core 28a (FIG. 3).

A second extruder 32 supplies—simultaneously with the supply of the thermally cross-linkable material—a first thermoplastic material to the outer disposed region of extrusion volume 28. This first thermoplastic material is supplied, as described, via a conduit 34 and a manifold 36, and constitutes an outwardly disposed, first outer layer 28b (FIG. 3).

A third extruder 38 supplies—simultaneously with the supply of the thermally cross-linkable material and of the first thermoplastic material—a second thermoplastic material to the inner disposed region of extrusion volume 28. This second thermoplastic material is supplied, as described, via a conduit 40, extending through vane 26, and a manifold 42 formed in die portion 24, and constitutes an inwardly disposed, second outer layer 28c (FIG. 3).

It is thus seen that the resulting tube is a plastic composite, having an inner, cylindrical, thermosetting plastic core 28a, surrounded by outwardly disposed and inwardly disposed outer, cylindrical, thermoplastic layers, 28b and 28c.

In accordance with one embodiment of the invention, the outwardly disposed, first outer layer 28b is removed after extrusion and recycled into the process.

It will be appreciated by persons skilled in the art that, in accordance with further embodiments of the present invention, there may be provided one or more additional, intervening layers between core layer 28a and either or both of outer layers 28b and 28c. These layers may be either thermosetting or thermoplastic materials, or non-plastic materials, provided that at least the inner core layer is a thermosetting material and the outermost layers are thermoplastic.

In order to obtain a desired thermosetting rate of the inner core material 28a during extrusion, heat is supplied to the die by a heating device, shown schematically at 43, and the residence time of the product inside the die is at least a predetermined time. The heat and time are selected so as to provide at least a predetermined minimum rate of cross-linking in the product during extrusion. A minimum desired rate of cross-linking is such that the inner core material 28a becomes more than minimally cross-linked, to the extent that high frictional resistance to its movement through the extruder die would be encountered in the absence of the outer, thermoplastic layers.

It is to be understood that various types of extruder may be used to perform the method of the invention. These include, inter alia, single screw extruders, double screw extruders and ram extruders, for example.

It will thus also be understood that various methods of coextrusion, other than that shown and described herein, may also be used to perform the method of the invention.

Any suitable materials may be employed as the inner core and outer layer materials, provided that the inner core material is a thermosetting material, while the outermost layers are thermoplastic; it being understood that the outer, thermoplastic materials may also be cross-linkable, although this may be by way of any known method of post-extrusion cross-linking. Some examples of preferred combinations of materials are set forth hereinbelow in the following examples:

EXAMPLE I

Product: pipe having the following dimensions:
  external diameter—40 mm
  wall thickness of thermosetting core material—3.0 mm
  wall thickness of outwardly disposed layer of thermoplastic material—0.3 mm
  wall thickness of inwardly disposed layer of thermoplastic material—0.3 mm.
Core material:
  high density polyethylene (HDPE) grade NCPE 1878 (produced by Neste Chemicals)—99%,
  cross-linking agent: Di-tertbutyl peroxide (DTBP)—0.5%
  anti-oxidant grade IRGANOX 1076 (produced by Ciba-Geigy)—0.5%.
  Extruder type: Weber ES 60
  Barrel temperature: 130–150 degrees Celsius
Outwardly disposed layer of thermoplastic material:
  Black HDPE grade NCPE 2467-BL (produced by Neste Chemicals), containing HDPE 97.5%, and carbon black 2.5%.
  Extruder type: Weber ES 30
  Barrel temperature: 160–190 degrees Celsius.
Inwardly disposed layer of thermoplastic material:
  HDPE grade NCPE 3419 (produced by Neste Chemicals)—99.5%, and
  anti-oxidant grade IRGANOX 1076 (produced by Ciba-Geigy)—0.5% .

Extruder type: Weber ES 30
Barrel temperature: 160–190 degrees Celsius.
Die temperature: 200–220 degrees Celsius.

EXAMPLE II

Product and equipment as in Example I.
Core material:
  medium density polyethylene (MDPE) grade Lupolen 3521C (produced by BASF Aktingesellschaft)—96.5% and
  carbon black 2.5%,
  cross-linking agent: 2,5-Dimethyl-2,5-di(tertbutylperoxy)hexyne(3) 1%.
  Barrel temperature: 130–150 degrees Celsius
Outwardly disposed layer of thermoplastic material:
  Ethylen-Vinyl-Alcohol (EVOH) grade EVAL E 105 (produced by Kuraray Co., Ltd).
  Barrel temperature: 170–210 degrees Celsius.
Inwardly disposed layer of thermoplastic material:
  MDFP grade Lupolen 3521C (produced by BASF Aktingesellschaft) 99%, and anti-oxidant grade IRGANOX 1076 (produced by Ciba-Geigy) 1.0%.
  Barrel temperature: 150–180 degrees Celsius.
  Die temperature: 190–210 degrees Celsius.

EXAMPLE III

Product: pipe having the following dimensions:
  external diameter—50 mm
  wall thickness of thermosetting core material—4.0 mm
  wall thickness of each outer layer of thermoplastic material —0.4 mm
Core material:
  Phenolformaldehyde grade Bakelite 31-1549-S (produced by Bakelite AG).
  Extruder type: Jolly GP-1300 (produced by B. M. Biraghi S.p.A.)
  Barrel temperature: 70–90 degrees Celsius
Both layers of thermoplastic materials:
  HDPE grade ELTEX B-4002 (produced by Solvay S.A.)
  Extruder type: Weber ES 30
  Barrel temperature: 160–190 degrees Celsius.
  Die temperature: 200–220 degrees Celsius.
After extrusion, the outwardly disposed, first HDPE layer is removed and recycled into the process.

Figure 4:
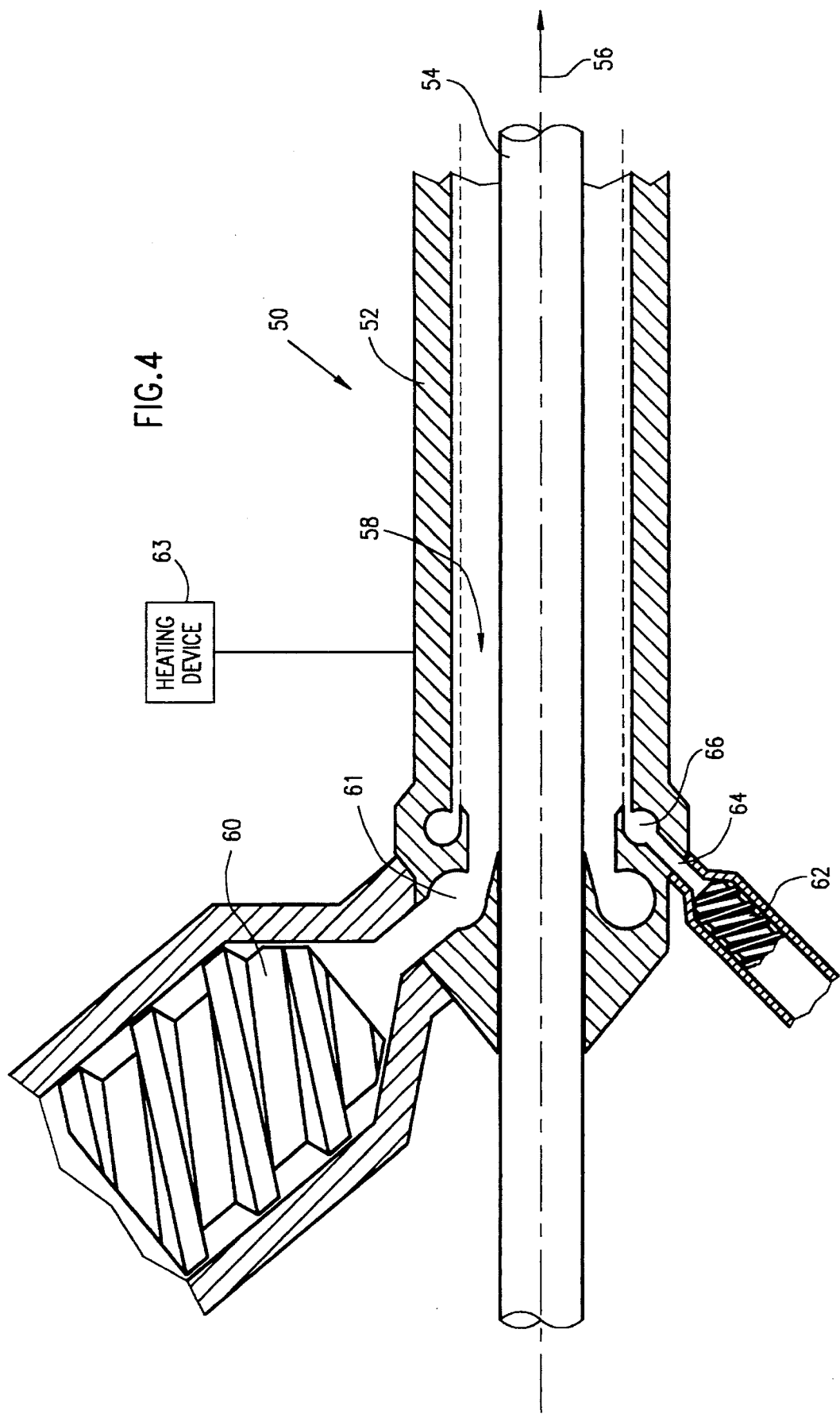
FIG. 4 illustrates an extrusion technique and product in accordance with another preferred embodiment of the present invention.
Figure 5:
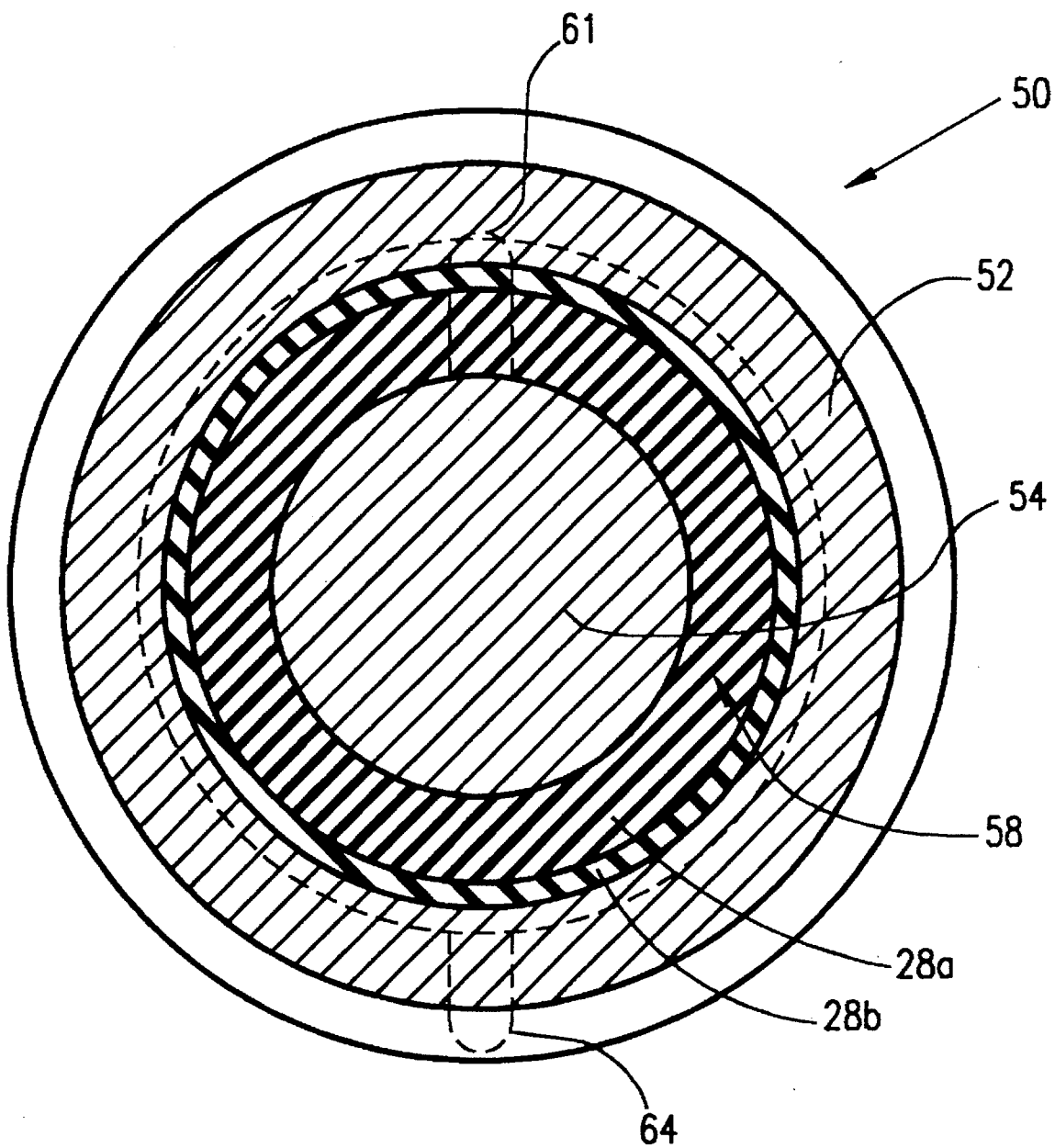
FIG. 5 is a sectional illustration taken along line 5—5 of FIG. 4.

Reference is now made to FIGS. 4 and 5 which illustrate exemplary extrusion apparatus and an extrusion method in accordance with an alternative preferred embodiment of the present invention, for production of composite plastic coated cables.

An extrusion die assembly 50 includes an outer, generally cylindrical die wall 52 through which passes a cable 54 to be coated, in a direction indicated by an arrow 56. The outer die wall 52 and cable 54 define an extrusion volume 58.

A main extruder 60 supplies a thermally cross-linkable core material to the extrusion volume 58, via a manifold 61, thereby to provide a core layer 58a (FIG. 5). A second extruder 62 supplies—simultaneously with the supply of the thermally cross-linkable material—a thermoplastic material to the outer disposed region of extrusion volume 58. This thermoplastic material is supplied, as described, via a conduit 64 and a manifold 66, and constitutes an outer layer 58b (FIG. 5).

In accordance with one embodiment of the invention, the outer layer 58b is removed after extrusion and recycled into the process.

It will be appreciated by persons skilled in the art that, in accordance with further embodiments of the present invention, there may be provided one or more additional, intervening layers between core layer 58a and outer layer 58b. These layers may be either thermosetting or thermoplastic materials, or non-plastic materials, provided that at least the inner core layer is a thermosetting material and the outermost layer is a thermoplastic material.

Referring once again to FIGS. 4 and 5, in order to obtain a desired thermosetting rate of the inner core material 58a during extrusion, heat is supplied to the die by heating device, shown schematically at 63, and the residence time of the product inside the die is at least a predetermined time. The heat and time are selected so as to provide at least a predetermined minimum rate of cross-linking in the product during extrusion. A minimum desired rate of cross-linking is such that the inner core material 58a becomes more than minimally cross-linked, to the extent that high frictional resistance to its movement through the extruder die would be encountered in the absence of the outer, thermoplastic layers.

It is to be understood that various types of extruder may be used to perform the method of the invention. These include, inter alia, single screw extruders, double screw extruders and ram extruders, for example.

It will thus also be understood that various methods of co-extrusion, other than that shown and described herein, may also be used to perform the method of the invention.

Any suitable materials may be employed in the present embodiment, provided that the core material is a thermosetting material, and that the outer layer is thermoplastic; it being understood that the outer, thermoplastic materials may also be cross-linkable, although this may be by way of any known method of post-extrusion cross-linking. Examples of typical combinations of materials are set forth hereinbelow:

EXAMPLE IV

Product: electrical cable having
  diameter of copper wire core—8.0 mm
  diameter of core layer material—17.6 mm
  diameter of thermoplastic outer layer—18.2 mm
Core material:
  Linear low density polyethylene (LLDPE) grade DOWLEX 2344E (produced by Dow Chemicals)—99%,
  Cross-linking agent (DTBP) 0.5% , and
  Antioxidant grade IRGANOX 1076 (produced by Ciba-Geigy) 0.5% .
  Extruder type: Weber ES 60
  Barrel temperature: 130–150 degrees Celsius
Thermoplastic material:
  Low density polyethylene grade Lupolen 2841D (produced by BASF Aktingesellschaft)—97%,
  carbon black 2.5%, and
  anti-oxidant grade IRGANOX 1076 (produced by Ciba-Geigy) 0.5%
  Extruder type: weber ES 30
  Barrel temperature: 150–180 degrees Celsius.
  Die temperature: 190–210 degrees Celsius.

EXAMPLE V

Same as example IV, but wherein the thermoplastic material is
  cross-linkable LDPE grade Polidan EC-41—95%, and
  catalyst PS NC1/PE 5% (both produced by Padanaplast S.p.A.)

After extrusion, the thermoplastic outer layer may be cross-linked by placing the product in a steam chamber for about 60 minutes.

EXAMPLE VI

Product: electrical cable having
  diameter of copper wire core—8.0 mm
  diameter of core layer material—12.0 mm
  diameter of intervening thermoplastic layer—16.0
  diameter of thermoplastic outermost layer—18.2 mm
Core material:
  Linear low density polyethylene (LLDPE) grade DOWLEX 2344E (produced by Dow Chemicals)—99%,
  Cross-linking agent (DTBP) 0.5% , and
  Antioxidant grade IRGANOX 1076 (produced by Ciba-Geigy) 0.5%.
  Extruder type: Weber ES 60
  Barrel temperature: 130–150 degrees Celsius
Intervening thermoplastic layer
  LDPE grade Lupolen 2841D (produced by BASF Aktingesellschaft).
Outermost thermoplastic layer:
  Low density polyethylene grade Lupolen 2841D (produced by BASF Aktingesellschaft)—97%,
  carbon black 2.5%, and
  anti-oxidant grade IRGANOX 1076 (produced by Ciba-Geigy) 0.5%
  Extruder type: Weber ES 45.
  Barrel temperature: 150–180 degrees Celsius.
  Die temperature: 190–210 degrees Celsius.

It will be appreciated by persons skilled in the art that the above described techniques enable a higher throughput than previously available with extrusion of plastic products consisting mainly of thermosetting or thermally cross-linkable materials, while reducing the wear on the die and similarly increasing the quality of the product.

Furthermore, any type of plastic or composite (plastic and non-plastic) extruded product may be made in accordance with the principles described above in conjunction with the foregoing exemplary description, it being appreciated that the invention is not limited to tubes and plastic coated cables only.

It will moreover be appreciated by persons skilled in the art that the present invention is not limited by what has been particularly shown and described hereinabove. Rather the scope of the present invention is defined only by the claims which follow:

I claim:

1. A process for the extrusion of plastic comprising:
  a first step of extruding which comprises extruding at least one layer (28a) of a thermally cross-linkable material in an extrusion apparatus (20) having at least one die wall (22);

a second step of extruding, performed simultaneously with said first step of extruding, and which comprises extruding at least one layer (28b) of thermoplastic material in the extrusion apparatus between the thermally cross-linkable material and the at least one die wall (22); and heating the thermally cross-linkable material, thereby to provide at least a rate of cross-linking thereof during said steps of extrusion of the plastic, such that said at least one layer (28a) of thermally cross-linkable material becomes more than minimally cross-linked to the extent that high frictional resistance to its movement through the extruder die would be encountered in absence of said at least one layer (28b) of thermoplastic material.

2. A process according to claim 1, wherein said first step of extruding comprises the step of extruding the thermally cross-linkable material in the form of a tube (28a), and said second step of extruding comprises extruding concentric layers (28b, 28c) of thermoplastic material between the thermally cross-linkable material and both inner (24) and outer (22) walls of the extrusion apparatus (20).

3. A process according to claim 1 and comprising a process for forming an extruded plastic coating on a non-plastic core, thereby to form a composite product.

4. A technique according to claim 1, and also including the step of cross-linking the thermoplastic material subsequent to said first and second steps of extruding.

5. A technique according to claim 1, and also including the step of removing the layer of thermoplastic material extruded between the thermally cross-linkable material and the outer die wall subsequent to first and second steps of extruding.

6. A technique according to claim 1, and wherein the thermally cross-linkable material is polyethylene or polyethylene copolymer.

7. A technique according to claim 1, and wherein one or more layers of a plastic material are extruded between the thermally cross-linkable material and said at least one layer of thermoplastic material.

8. A process according to claim 2, wherein the thermally cross-linkable material is polyethylene or polyethylene copolymer, and wherein at least one of the concentric layers (28b, 28c) of thermoplastic material is polyethylene or polyethylene copolymer.

9. A process according to claim 2, wherein the thermally cross-linkable material is polyethylene or polyethylene copolymer, wherein at least one additional layer of plastic material is extruded between the thermally cross-linkable material (28a) and at least one of the layers (28b, 28c) of thermoplastic material, and wherein at least one layer of polyethylene or polyethylene copolymer is extruded between the thermally cross-linkable material (28a) and the concentric layers of thermoplastic material.

* * * * *